(12) United States Patent
Tessarolo

(10) Patent No.: US 7,039,789 B2
(45) Date of Patent: May 2, 2006

(54) CIRCULAR ADDRESSING ALGORITHMS PROVIDING INCREASED COMPATIBILITY WITH ONE OR MORE HIGHER-LEVEL PROGRAMMING LANGUAGES

(75) Inventor: Alexander Tessarolo, Sydney (AU)

(73) Assignee: Texas Instruments Incorporated, Dallas, TX (US)

(*) Notice: Subject to any disclaimer, the term of this patent is extended or adjusted under 35 U.S.C. 154(b) by 359 days.

(21) Appl. No.: 10/349,225

(22) Filed: Jan. 22, 2003

(65) Prior Publication Data

US 2003/0172246 A1    Sep. 11, 2003

Related U.S. Application Data

(60) Provisional application No. 60/363,481, filed on Mar. 11, 2002.

(51) Int. Cl.
*G06F 12/00* (2006.01)
(52) U.S. Cl. .................... 711/220; 711/215
(58) Field of Classification Search ............. 711/219
See application file for complete search history.

(56) References Cited

U.S. PATENT DOCUMENTS

| | | | | |
|---|---|---|---|---|
| 6,047,364 A * | 4/2000 | Kolagotla et al. | ............ | 711/217 |
| 6,073,228 A * | 6/2000 | Holmqvist et al. | ......... | 711/217 |
| 6,148,386 A * | 11/2000 | Rhodes et al. | ............... | 711/200 |
| 6,560,691 B1 * | 5/2003 | Chen | ........................... | 711/219 |
| 6,760,830 B1 * | 7/2004 | Inoue et al. | ................ | 711/220 |
| 6,782,447 B1 * | 8/2004 | Ostler et al. | ................ | 711/110 |

OTHER PUBLICATIONS

Willems et al, "Modulo-addressing utilization in automatic software synthesis for digital signal processors", Acoustics, Speech, and Signal Processing, 1997 vol.: 1 , 21-24 pp.: 687-690 □□.*
Prasad et al.,"Modulo address generators for DSPs", 1998 Electronic Letters, vol. 34 No. 17, 1653-1654 □□.*

* cited by examiner

*Primary Examiner*—Mano Padmanabhan
*Assistant Examiner*—Paul Baker
(74) *Attorney, Agent, or Firm*—Robert D. Marshall, Jr.; W. James Brady, III; Frederick J. Telecky, Jr.

(57) ABSTRACT

Logic for circular addressing providing increased compatibility with higher-level programming languages accesses a base pointer pointing to a first element of an array including a number of elements each including an address. The first element of the array includes an address less than the address of every other element of the array. The logic accesses a base-pointer offset, adds the base-pointer offset to the base pointer to calculate an address of a current element of the array, and stores the calculated address for subsequent access by one or more operations. After the current element has been accessed by the one or more operations, the logic increments the base-pointer offset by one, accesses a maximum offset value equal to the number of elements of the array, and compares the incremented base-pointer offset with the maximum offset value. If the incremented base-point offset is less than the maximum offset value, the logic stores the incremented base-pointer offset. If the incremented base-pointer offset is equal to the maximum offset value, the logic sets the base-pointer offset to zero and stores the set base-pointer offset.

5 Claims, 2 Drawing Sheets

CIRCULAR ADDRESSING ALGORITHMS PROVIDING INCREASED COMPATIBILITY WITH ONE OR MORE HIGHER-LEVEL PROGRAMMING LANGUAGES

This application claims priority under 35 USC §119(e)(1) of Provisional Application No. 60/363,481, filed Mar. 11, 2002.

TECHNICAL FIELD OF THE INVENTION

This invention relates generally to processor operations and more particularly to circular addressing algorithms providing increased compatibility with one or more higher-level programming languages.

BACKGROUND OF THE INVENTION

Circular addressing is typically implemented using three pointers. The first pointer points to the first element of the array, and the second pointer points to the last element of the array. The third pointer points to consecutive elements of the array over the course of a series of operations involving data contained within the array, which operations use the third pointer to determine which elements of the array to access at different times. When an element is accessed, the third pointer is incremented and its value is compared with the value of the second pointer to determine whether the last element of the array has been accessed. If the last element of the array has been accessed, the value of the third pointer is changed such that it points to the first element of the array. Such an algorithm for circular addressing may be substantially incompatible with higher-level programming languages, such as C, in that it may not be easily described using the constructs of such languages.

SUMMARY OF THE INVENTION

Particular embodiments of the present invention may reduce or eliminate disadvantages and problems traditionally associated with circular addressing.

In one embodiment of the present invention, logic for circular addressing providing increased compatibility with one or more higher-level programming languages accesses a base pointer pointing to a first element of an array. The array includes a number of elements that each include an address. The first element of the array includes an address that is less than the address of every other element of the array. The logic accesses a base-pointer offset, adds the base-pointer offset to the base pointer to calculate an address of a current element of the array, and stores the calculated address for subsequent access by one or more operations. After the current element has been accessed by the one or more operations, the logic increments the base-pointer offset by one, accesses a maximum offset value equal to the number of elements of the array, and compares the incremented base-pointer offset with the maximum offset value. If the incremented base-point offset is less than the maximum offset value, the logic stores the incremented base-pointer offset. If the incremented base-pointer offset is equal to the maximum offset value, the logic sets the base-pointer offset to zero and stores the set base-pointer offset.

Particular embodiments of the present invention may provide one or more technical advantages. For example, particular embodiments may provide a circular addressing algorithm that may be more easily described using the constructs of higher-level programming languages, such as C, and' thus may be more compatible with such languages. Certain embodiments may provide one or more other technical advantages which may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description, taken in conjunction with the accompanying drawings, in which.

DESCRIPTION OF EXAMPLE EMBODIMENTS

Figure 1:
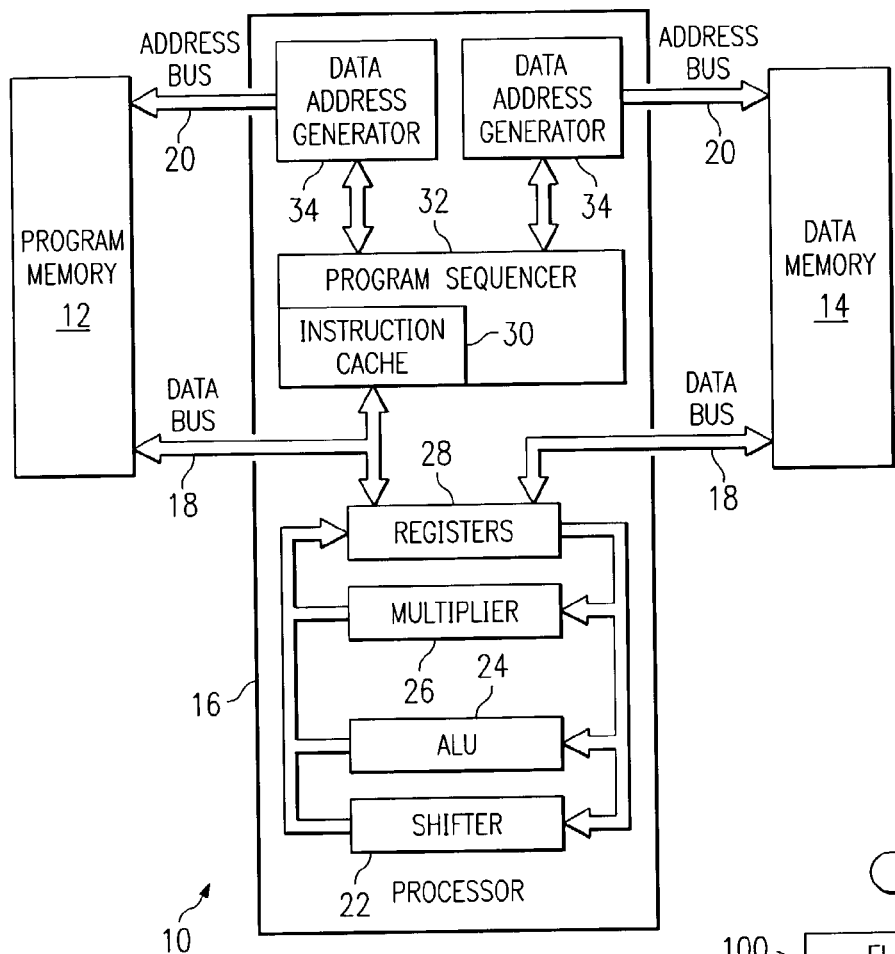
FIG. 1 illustrates an example processor system.

FIG. 1 illustrates an example processor system 10, which may include a digital signal processor (DSP). Although a particular processor system 10 is described and illustrated, the present invention contemplates any suitable processor system 10 including any suitable architecture. Processor system 10 may include program memory 12, data memory 14, and processor 16. Program memory 12 may be used to store program instructions for operations executed by processor 16, and data memory 14 may be used to store data used in operations executed by processor 16. Data (which may include program instructions, data used in operations executed by processor 16, or any other suitable data) may be communicated between processor 16 and program memory 12 and between processor 16 and data memory 14 using data buses 18, which may include any suitable physical medium for such communication. For example, data buses 18 may include one or more wires coupling processor 16 to program memory 12 and data memory 14. The number of bits that may be communicated across a data bus 18 in one clock cycle (which may include a unit of time between two adjacent pulses of a clock signal for processor system 10) may be limited. For example, in a 32-bit environment, a maximum of thirty-two bits may be communicated across each data bus 18 in one clock cycle. Data addresses (which may specify locations for data within program memory 12, data memory 14, or elsewhere and may, where appropriate, include the locations themselves) may be communicated between processor 16 and program memory 12 and between processor 16 and data memory 14 using address buses 20, which may include any suitable physical medium for such communication. For example, address buses 20 may include one or more wires coupling processor 16 with program memory 12 and data memory 14. Similar to data buses 18, the number of bits that may be communicated across an address bus 20 in one clock cycle may be limited.

Processor 16 may execute mathematical, logical, and any other suitable operations and may, for example only and not by way of limitation, include one or more shifters 22, arithmetic-logic units (ALUs) 24, multipliers 26, data registers 28, instruction caches 30, program sequencers 32, and data address generators 34. Although a particular processor 16 is described and illustrated, the present invention contemplates any suitable processor 16 including any suitable components. Shifter 22 may be used to left- or right-shift data units and perform other suitable tasks. ALU 24 may be used for addition, subtraction, absolute value operations, logical operations (such as, for example, AND, OR, NAND, NOR, and NOT operations), and other suitable tasks. Multiplier 26 may be used for multiplication and other suitable tasks. In a 32-bit environment, shifter 22, ALU 24, and multiplier 26 may each process a maximum of thirty-two bits in one clock cycle. For example, ALU 24 may in one clock cycle add numbers that include at most thirty-two bits. To add numbers that include more than thirty-two bits, the numbers may be divided into parts that each include thirty-two or fewer bits and added in parts. Registers 28 may include a number of memory locations for storing intermediate operation results, flags for program control, and the like. For example, registers 28 may include one or more general data registers, temporary registers, condition code registers (CCRs), status registers (SRs), address registers, and other suitable registers. In a 32-bit environment, each register 28 may be used to store a maximum of thirty-two bits. Instruction cache 30 may be used to store one or more program instructions for recurring operations. For example, program instructions for one or more operations that are part of a loop of operations executed by processor 16 may be stored using instruction cache 30 such that program memory 12 need not be accessed each time a program instruction for one or more of the operations is to be executed. Program sequencer 32 may direct the execution of operations by processor 16 and perform other suitable tasks. Data address generators 34 may communicate addresses to program memory 12 and data memory 14 specifying memory locations within program memory 12 and data memory 14 from which data may be read and to which data may be written. Although particular components of processor 16 are described as performing particular tasks, any suitable components of processor 16, alone or in combination, may perform any suitable tasks. In addition, although the components of processor 16 are described and illustrated as separate components, any suitable component of processor 16 may be wholly or partly incorporated into one or more other components of processor 16.

Circular addressing may include an addressing mode in which processor 16 accesses consecutive elements (which may include memory locations within data memory 14 or program memory 12, elsewhere within processor system 10, or outside processor system 10 and may, where appropriate, include the data at such memory locations) of an array (which may include two or more consecutively addressed elements) over the course of a series of operations and circles back to the first element of the array upon reaching the last element of the array. As an example only and not by way of limitation, circular addressing may be described in the programming language C (and possibly in other languages) as follows:

```
MemoryAddress = &BasePointer [Index++];
if( Index == N ) Index = 0;
```

N may include the number of elements of an array, MemoryAddress may include the address of the current element of the array, &BasePointer may include the address of the first element of the array, and Index may include the number of the current element of the array. After an element of the array is accessed (which may include the element being read or written to), Index may be incremented by one. If Index is equal to N, Index is set to zero such that Index includes the number of the first element of the array and MemoryAddress includes the address of the same.

In particular embodiments, circular addressing may be implemented using a memory location pointer, a base pointer, a base-pointer offset, and a maximum offset value. The memory location pointer may point to consecutive elements of an array over the course of a series of operations and may be used in the operations to determine which element of the array to access, and the base pointer may point to the first element of the array. The value of the memory location pointer may be determined by adding the value of the base pointer to the value of the base pointer offset, which may originally be equal to zero. After an element of the array is accessed, the base pointer offset may be incremented and compared with the maximum offset value, which may be equal to the number of elements of the array. If the base pointer offset is equal to the maximum offset value, the base pointer offset may be set to zero, causing the memory location pointer to point to the first element of the array. Such an algorithm for circular addressing may, as an example only and not by way of limitation, be described as follows:

```
MemoryAddress = BasePointer + Offset;
Offset++;
if ( Offset == MaxOffsetValue )
    Offset = 0;
```

MemoryAddress may include a memory location pointer, BasePointer may include a base pointer, Offset may include a base-pointer offset, and MaxOffsetValue may include a maximum offset value.

Such an algorithm may be implemented in hardware associated with processor system 10 using three registers: one for the base pointer, one for the base pointer offset, and one for the maximum offset value. As an example only and not by way of limitation, the following registers 28 may be defined:

```
RegA = BasePointer
RegB = Offset
RegC = MaximumOffsetValue
```

Herein, reference to a particular register may include the register itself or, where appropriate, data stored in the register. An addressing mode may then be defined using the following algorithm:

| *+RegA[%RegB++:RegC] | ; address = RegA + RegB |
| | ; RegB++ |
| | ; if( RegB == RegC ) |
| | ;   RegB = 0; |

Such an algorithm, in particular embodiments, may substantially mimic the circular addressing description in the programming language C (and possibly other languages) described above and may therefore be more directly mapped to a common C construct for implementing circular addressing:

| C Description | Hardware Description |
|---|---|
| MemoryAddress = &BasePointer [Index++]; if( Index == N ) Index = 0; | MemoryAddress = RegA + RegB; RegB++; if( RegB == RegC ) RegB = 0; |

In particular embodiments, such an algorithm may be described in a suitable assembly language as follows:

```
Mov  RegD,*+RegA[%RegB++:RegC]   ; Load RegD with the value
                                 ; pointed by RegA using
                                 ; the index value in RegB
                                 ; and the size value in
                                 ; RegC. Post-modify the
                                 ; contents of RegB
                                 ; according to the
                                 ; circular addressing mode
```

Figure 2:
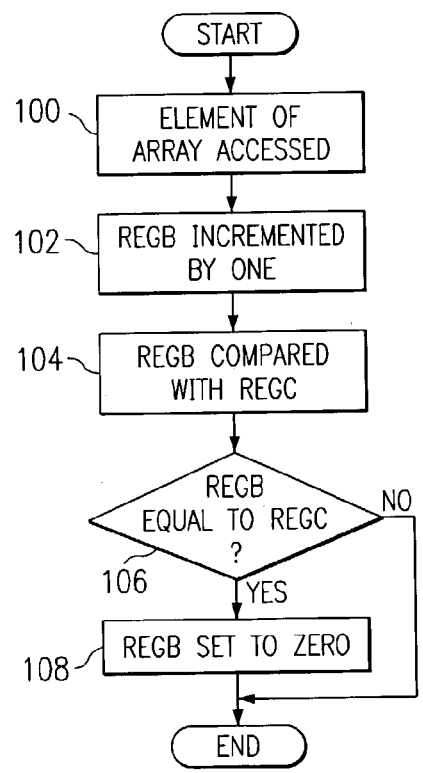
FIG. 2 illustrates an example circular addressing method.

FIG. 2 illustrates an example circular addressing method. The method begins at step 100 where an element of an array may be accessed. The address of the element may be equal to the sum of RegA and RegB. As described above, RegA may include a base pointer and RegB may include a base-pointer offset. At step 102, RegB may be incremented by one. At step 104, RegB may be compared with RegC. As described above, RegC may include a maximum offset value. At step 106, if RegB is equal to RegC, the method may proceed to step 108. At step 108, RegB may be set to zero, at which point the method may end. At step 106, if RegB is not equal to RegC, the method may end.

Figures 3A, 3B:
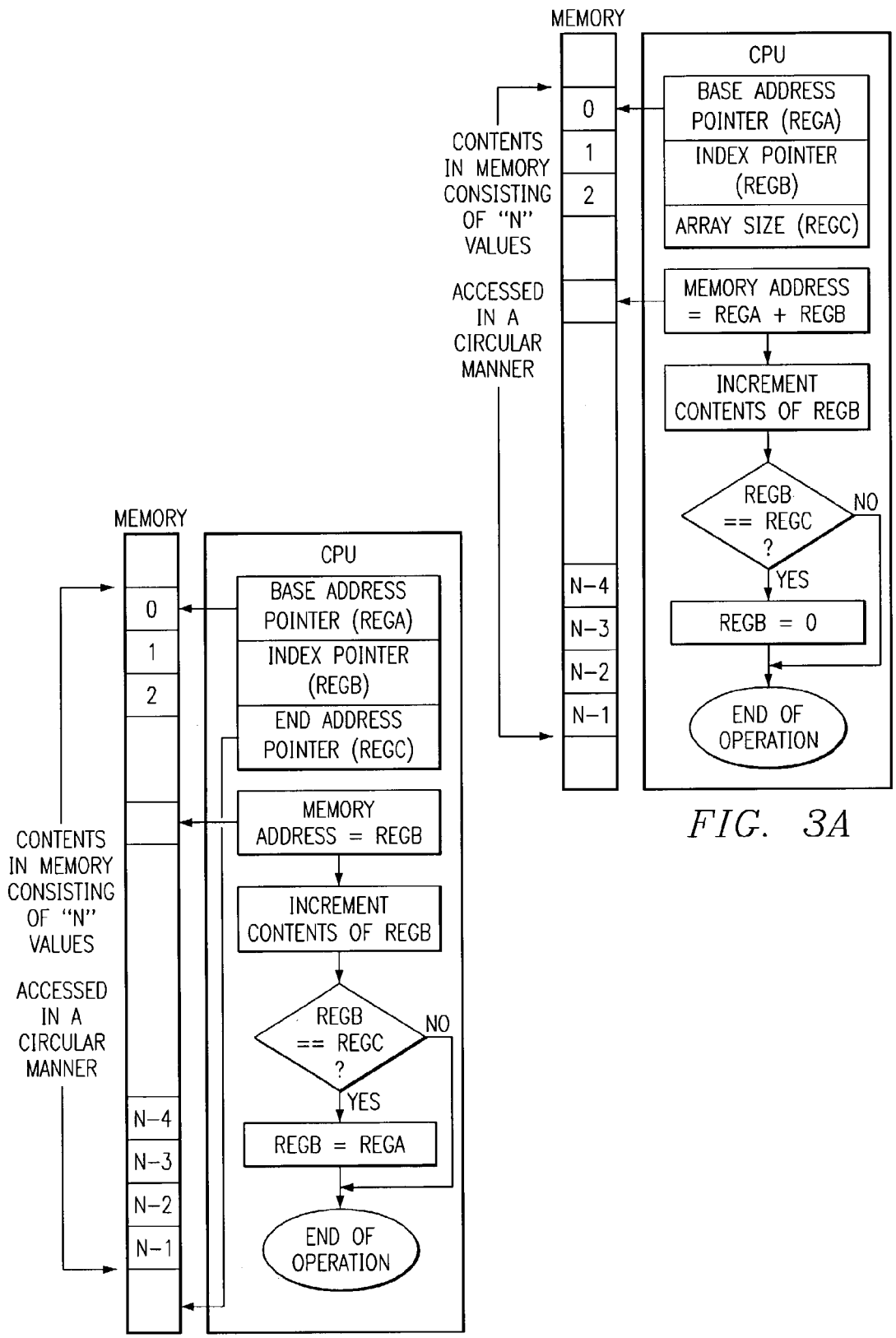
FIGS. 3a and 3b together illustrate one or more differences between one or more particular embodiments of the present and previous circular addressing techniques.

FIG. 3a illustrates one or more particular embodiments of the present invention, and FIG. 3b illustrates previous circular addressing techniques. Together, FIGS. 3a and 3b illustrate one or more differences between one or more particular embodiments of the present and previous circular addressing techniques.

Although the present invention has been described with several embodiments, sundry changes, substitutions, variations, alterations, and modifications may be suggested to one skilled in the art, and it is intended that the invention may encompass all such changes, substitutions, variations, alterations, and modifications falling within the spirit and scope of the appended claims.

What is claimed is:

1. A method for circular addressing in a processor system providing increased compatibility with one or more higher-level programming languages, the method comprising responding to a single assembly language memory access instruction in a circular addressing mode specifying a base pointer, a base-pointer offset and a maximum offset value by the steps of:
   accessing a said base pointer;
   accessing a said base-pointer offset;
   adding the base-pointer offset to the base pointer to calculate an address of a current memory access in the circular addressing mode;
   accessing a current element in memory at the calculated address;
   after accessing the current element, incrementing the base-pointer offset by one;
   accessing a said maximum offset value;
   comparing the incremented base-pointer offset with the maximum offset value;
   if the incremented base-point offset is less than the maximum offset value, storing the incremented base-pointer offset; and
   if the incremented base-pointer offset is equal to the maximum offset value, setting the base-pointer offset to zero and storing the set base-pointer offset.

2. The method of claim 1, wherein:
   the base pointer, base-pointer offset, and maximum offset value are each stored in a register; and
   the single assembly language memory access instruction in the circular addressing mode specifies the base pointer by specifying a first register, specifies the base-pointer offset by specifying a second register and specifies the maximum offset value by specifying a third register.

3. The method of claim 1, wherein the one or more higher-level programming languages comprise C.

4. The logic of claim 3, providing increased compatibility with C in that the logic is describable using one or more constructs of C.

5. A data processor operable in a circular addressing mode comprising:
   a set of data registers;
   a data address generator adapted to supply an address to a memory for data access; and
   a program sequencer responsive to program instructions to direct execution of data processing operations, said program sequencer responsive to a single assembly language memory access instruction in a circular addressing mode specifying a base pointer register, a base-pointer offset register and a maximum offset value register within said set of data registers to:
   access data stored in said base pointer register,
   access data stored said base-pointer offset register,
   adding the base-pointer offset data to the base pointer data to calculate an address of a current element of the array memory access in the circular addressing mode;
   control said data address generator to supply said calculated address to the memory for accessing a current element in memory at said calculated address,
   after accessing said current element, increment the base-pointer offset data by one,
   access data stored in said maximum offset value register,
   compare the incremented base-pointer offset data with the maximum offset value data,
   if the incremented base-point offset data is less than the maximum offset value data, storing the incremented base-pointer offset in said base-pointer offset register, and
   if the incremented base-pointer offset data is equal to the maximum offset value data, storing zero in said base-pointer offset register.

* * * * *